United States Patent [19]
Tortorella et al.

[11] Patent Number: 5,443,160
[45] Date of Patent: Aug. 22, 1995

[54] VARIABLE POSITION DIVIDER FOR STORAGE TRAY

[75] Inventors: Dennis J. Tortorella, Arlington Heights, Ill.; William R. Dorr, Houston, Tex.

[73] Assignee: Fellowes Manufacturing Company, Itasca, Ill.

[21] Appl. No.: 189,303

[22] Filed: Jan. 28, 1994

[51] Int. Cl.⁶ .............................................. B65D 1/34
[52] U.S. Cl. ..................................... 206/561; 206/425; 220/544; 220/549
[58] Field of Search ................ 206/425, 561; 220/534, 220/541, 544, 549

[56] References Cited

U.S. PATENT DOCUMENTS

| | | |
|---|---|---|
| D.160,015 | 9/1950 | Rauch et al. . |
| 1,489,804 | 4/1924 | Vlissingen ........................ 220/549 |
| 1,918,765 | 7/1933 | Lombardini ..................... 220/549 |
| 2,042,167 | 5/1936 | Beeler ................................ 220/549 |
| 2,101,378 | 12/1939 | Wiskoff . |
| 2,238,451 | 4/1941 | Roth . |
| 2,249,548 | 7/1941 | Swimmer ......................... 220/549 |
| 2,281,845 | 5/1942 | Kaplan . |
| 2,297,081 | 9/1942 | Slough . |
| 2,304,007 | 12/1942 | Mendelson . |
| 2,346,705 | 4/1944 | Sabin . |
| 2,368,349 | 1/1945 | Cornish ............................ 220/544 |
| 2,371,713 | 3/1945 | Short ................................. 220/549 |
| 2,647,520 | 8/1953 | Lee ..................................... 220/549 |
| 2,682,966 | 7/1954 | Wiepert . |
| 3,129,838 | 4/1964 | Wormer, III . |
| 3,353,704 | 11/1967 | Belcher et al. . |
| 3,807,572 | 4/1974 | Luvara et al. . |
| 4,126,229 | 11/1978 | Sheres . |
| 4,128,175 | 12/1978 | Schweizer . |
| 4,396,123 | 8/1983 | Swan . |
| 4,453,785 | 6/1984 | Smith . |
| 4,511,194 | 4/1985 | Park et al. . |
| 4,544,213 | 10/1985 | Long et al. . |
| 4,600,110 | 7/1986 | Timor . |
| 4,629,067 | 12/1986 | Pavlik et al. . |
| 4,640,416 | 2/1987 | Northrup et al. . |
| 4,684,027 | 8/1987 | Wright . |
| 4,712,679 | 12/1987 | Lowe . |
| 4,743,156 | 5/1988 | Raffay et al. . |
| 4,779,730 | 10/1988 | Hartsfield et al. . |
| 4,828,133 | 5/1989 | Hougendobler . |
| 4,848,574 | 7/1989 | Murphy et al. . |
| 4,875,743 | 10/1989 | Gelardi et al. . |
| 4,884,692 | 12/1989 | Middlebrooks . |
| 4,889,244 | 12/1989 | Hehn et al. . |
| 4,909,384 | 3/1990 | About . |
| 4,949,853 | 8/1990 | Klein et al. . |
| 4,966,278 | 10/1990 | Rosi et al. . |
| 5,201,414 | 4/1993 | Kaszubinski ...................... 206/425 |

FOREIGN PATENT DOCUMENTS 1160414 8/1969 United Kingdom .

OTHER PUBLICATIONS

1991 Office Products Catalog from City Office Supply Corp., Copyrighted 1990, pp. 467–478.

May–Jun. 1991 MISCO ® Catalog, center tear-out page.

Visible Supply Computer Supply Corporation catalog, p. 45, 1991 Promotional Bulletin, Innovative Concepts, 1991.

A photostatic copy of three pictures of the inside of a multibox purchased from MISCO sometime in 1992.

Label from MEMOREX ® Universal Storage System, 1992.

A portion of an Oct. 1992 GLOBAL ® catalog, pp. 17–20.

*Primary Examiner*—David T. Fidei
*Attorney, Agent, or Firm*—Willian Brinks Hofer Gilson & Lione

[57] ABSTRACT

A storage tray is provided with at least one removable divider having a guide that is removably received in a channel formed on the bottom of the tray. The guide is shaped to cooperate with the channel so that when the divider is substantially vertical, the divider is slidably along the entire length of the channel and when the divider is tilted from the substantially vertical position, the divider is substantially secured in position.

17 Claims, 3 Drawing Sheets

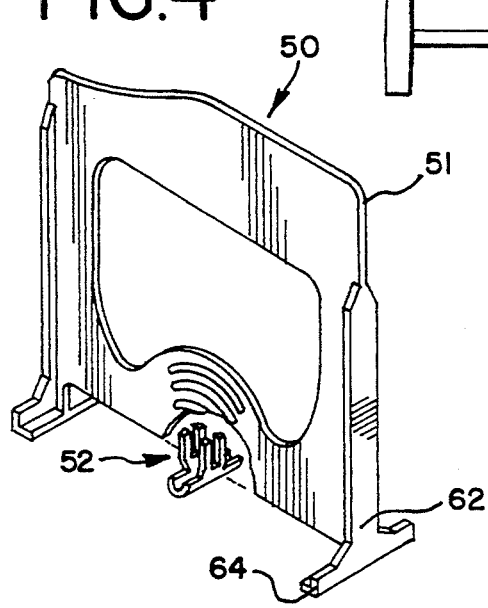
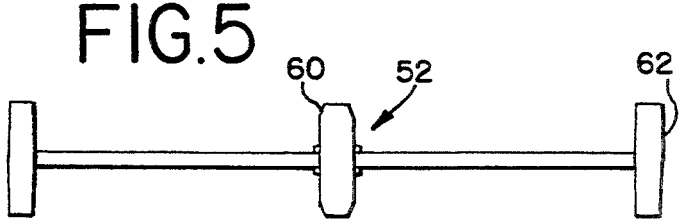
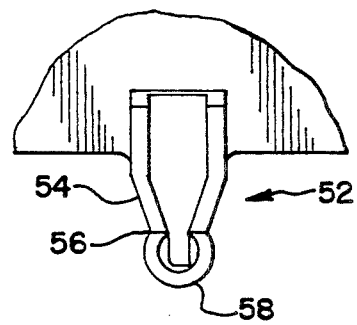
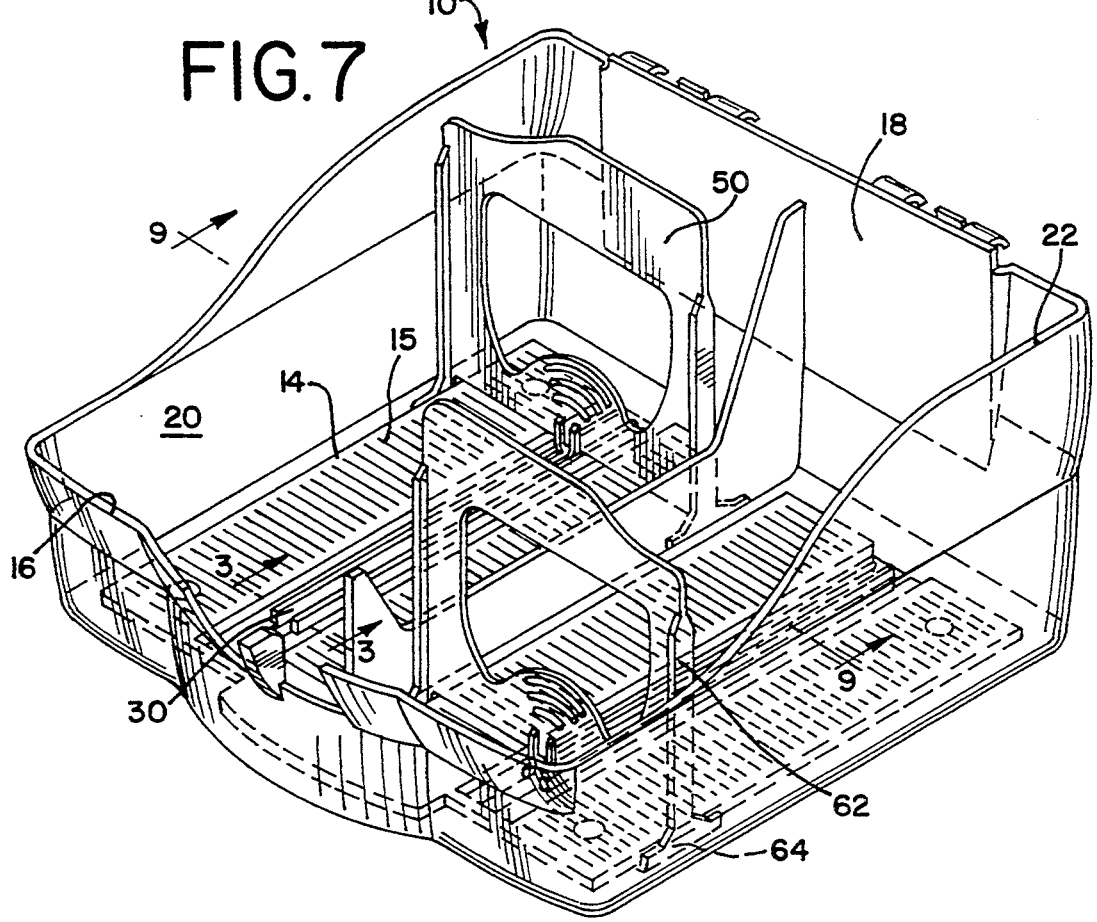

VARIABLE POSITION DIVIDER FOR STORAGE TRAY

BACKGROUND OF THE INVENTION

The present invention relates to a storage tray or container useful for storing and organizing different types of information storage devices, preferably, information storage devices for use with computers. At the present, the following types of information storage devices are prevalent: 5¼ inch computer diskettes also known as "floppy disks," mini data cartridges, CD-ROM optical disks and compact disks which can be storm in a container that is slightly wider and thicker than a floppy disk, and 3½ inch computer diskettes.

Generally, storage trays have been designed to accommodate a single particular type of information storage device, i.e., a tray configured to solely store 3½ inch computer diskettes. Alternatively, storage trays have been designed to accommodate a variety of different types of information storage devices. Such trays are shown and described in U.S. Pat. No. 5,205,625 and in U.S. Ser. No. 07/955,113 both of which are incorporated herein by reference. Each of these types of trays generally use a removable divider having feet that fit into a slot provided in the bottom of the storage tray to separate some information storage devices from others, e.g., different categories of information and the like.

Unfortunately, the slots are spaced from each other at discrete intervals. The dividers, therefore, can be positioned within the storage tray only at discrete intervals. As a result, if the information storage devices do not occupy the entire space between each divider, the devices are not positioned substantially vertically within the storage tray which makes them difficult to view. In addition, valuable space is wasted. Consequently, there exists a need for dividers that can be located at any number of positions within the storage tray.

The design of the storage tray and dividers according to the present invention allows the divider to be moved to any position within the tray.

SUMMARY OF THE INVENTION

The present invention provides a storage tray with at least one removable divider having a guide that removably engages a channel formed on the bottom of the storage tray. The removable divider, when in a substantially vertical position, is slidably moveable along the length of the channel and when in a position tilted from the substantially vertical position, is substantially locked in position. As a result, the divider can be positioned along the length of the tray at any number of positions.

In one embodiment of the present invention, the tray includes a bottom with a front wall opposite a rear wall and a first side wall opposite a second side wall. Each wall extends upward frown the bottom. The front and rear walls are substantially normal to the first and second side walls. A channel is formed on the bottom parallel to the first and second side walls. The tray also includes at least one divider having a guide that removably engages the channel. The guide is shaped to cooperate with the channel so that when the divider is substantially vertical, the divider is slidable along the entire length of the channel and when the divider is tilted from the substantially vertical position, the divider is substantially secured in position.

Preferably, the channel is defined by a pair of spaced apart fingers extending upward from the bottom of the tray. The fingers are tapered from the distal end to the proximal end so that the width of the channel near the proximal end is less than the width of the channel near the distal end. The distal end of each finger preferably has a projection that extends inward or toward the other finger. In one embodiment, the fingers are resilient so that they can flex laterally to allow the guide to be vertically inserted within and vertically removed from the channel. The bottom of the tray has a top surface that defines a substantially horizontal shelf that has a height greater than the height of the fingers defining the channel. In this way, information storage devices or other material to be stored within the storage tray can be placed on the shelf without contacting the fingers defining the channel. In a preferred embodiment, the bottom is provided with at least one groove parallel with the channel. The groove receives a stabilizing member formed on the divider, preferably co-extensive with a lateral side of the divider so that when the guide of the divider engages the channel, the divider is substantially restricted from torsional movement. More preferably, two parallel grooves are provided with each located on opposite sides of the channel. The divider is provided with two stabilizing members, each preferably formed co-extensive with the lateral sides of the divider and received in a groove to substantially restrict the divider from torsional movement.

In another embodiment, the tray also includes a longitudinal partition extending upward from the bottom and parallel to either the first or the second side wall. The partition extends substantially from the front of the tray to the rear of the tray. In this embodiment, two channels are provided with one channel being located on one side of the partition and the other channel being located on the other side of the partition. In this way two columns of material may be stored.

Of course it is to be understood that the storage tray of the present invention can be used to store and organize any number and type of media and their respective cases, or containers, but for ease of reference the specification and appended claims will refer to 3 1/2 inch computer disks.

BRIEF DESCRIPTION OF THE DRAWINGS

FIG. 4 is a perspective view of the divider of the present invention with a portion cut away to show the guide.

FIG. 5 is a top view of the divider of the present invention.

FIG. 6 is a detail view of the guide of the divider of the present invention.

FIG. 7 is a front perspective view of an alternative embodiment of the storage tray of the present invention. The storage tray has a longitudinal partition and two channels each with a single divider.

DETAILED DESCRIPTION OF THE INVENTION AND PREFERRED EMBODIMENTS

Figure 1:
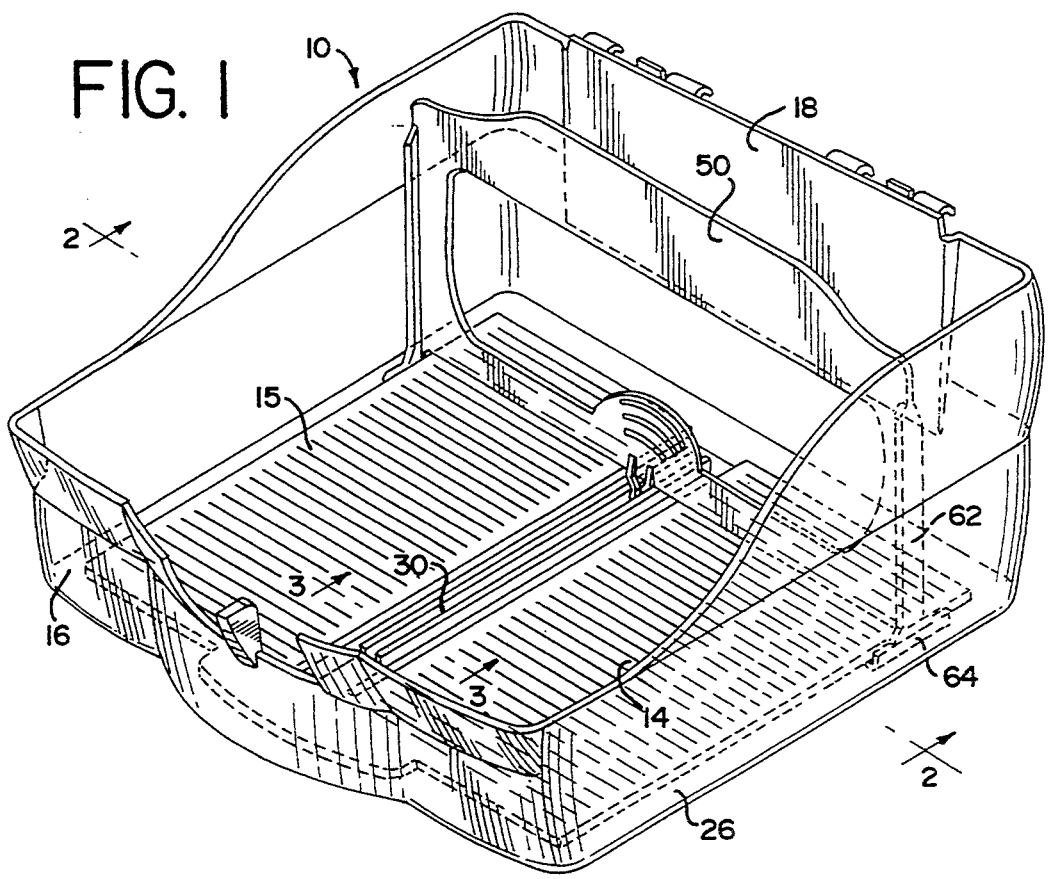
FIG. 1 is a front perspective view of one embodiment of the storage tray of the present invention with a divider of the present invention positioned within the storage tray.

FIG. 1 shows one embodiment of the storage tray of the present invention with a divider installed. The storage tray 10 has a bottom 12 with a top surface 14 defining a shelf and a four walls extending upward from the bottom. The top surface 14 of the bottom may also be provided with spaced apart ridges 15 to aid in positioning and retaining the information storage devices within the tray.

The walls include a front wall 16 opposite a rear wall 18 with the front and rear walls substantially normal to the first 20 and second side walls 22. The bottom also includes at least one channel 30 formed in the bottom of the tray and defined by a pair of upward extending fingers 32a, 32b. Preferably, the channel extends substantially from the front wall to the rear wall. The channel receives a removable divider 50 that can be slidably moved along the entire length of the channel when the divider is in a substantially vertical position. When the divider 50 is tilted from a substantially vertical position, the divider is substantially locked in position.

In the most preferred embodiment, the tray is molded from a suitable plastic material with the channel and at least the guide of the divider molded out of polypropylene. By molding the channel and the guide out of polypropylene, the divider easily slides along the channel.

Obviously, a top or cover (not shown) for the tray can be provided as is shown, for example, in U.S. Pat. No. 5,205,625 or U.S. Ser. No. 07/955,113, both of which are incorporated herein by reference. Although it is desirable to provide a cover for the storage tray to protect items stored within the tray, one skilled in the art will appreciate that the cover is not part of the present invention.

As noted above, the channel is formed in the bottom of the tray. The channel can be located anywhere between the first side wall 20 and the second side wall 22. Preferably, where only a single channel is provided it is located at about the midpoint between the first and second side wall.

The channel may extend any distance parallel to the first and second wall as dictated by, among other things, manufacturing considerations. For example, the channel may extend the entire distance from the front wall to the rear wall, or may extend from the front wall only a portion of the distance to the rear wall, or may extend from the rear wall only a portion of the distance to the front wall, or each end of the channel may be spaced from both the front and rear walls.

Alternatively, the channel may be provided laterally so that it extends from one side wall to the other side wall parallel to either the front or rear wall. As with the channel described above, the channel may extend from the first side wall to the second side wall, or may extend from the first side wall only a portion of the distance to the second side wall, or may extend from the second side wall only a portion of the distance to the first side wall, or each end of the channel may be spaced from both the front and rear walls.

Figure 2:
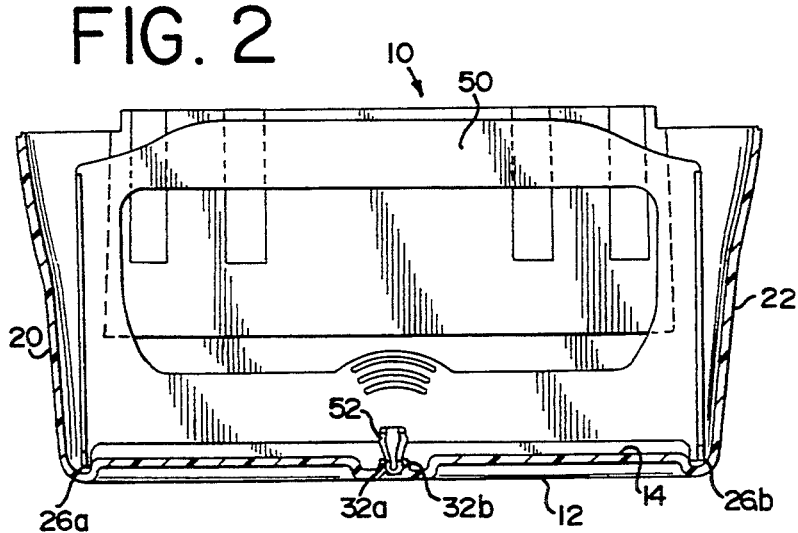
FIG. 2 is a cross-sectional view of the storage tray of FIG. 1 along line 2—2.
Figure 3:
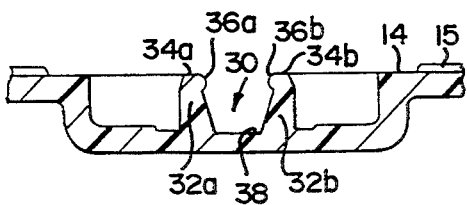
FIG. 3 is a detail view of the channel of the tray of FIG. 1 and FIG. 7.

The fingers 32a and 32b that define the channel 30 extend upward from the bottom a distance slightly less than the height of the top surface 14 of the bottom that defines the substantially horizontal shelf, as best seen in FIG. 2. In this way, items to be stored in the tray can rest on the shelf without being interfered with by the fingers.

In one embodiment, the fingers 32a, 32b are slightly resilient to permit lateral movement such as when the guide 52 of the divider is forced vertically downward into the channel. This embodiment is particularly preferred when the channel extends the entire distance from the front wall to the rear wall or from the first side wall to the second side wall. In another embodiment, the fingers are rigid or stiff so that they do not move laterally. In this embodiment, the guide can not be forced vertically downward into the channel. This particular embodiment may be useful when the channel does not extend the entire distance from the front wall to the rear wall or from the first side wall to the second side wall.

Preferably, each finger is tapered inward from the distal end 34 to the proximal end 38 so that the width of the channel decreases from the distal end to the proximal end, i.e., the width of the top of the channel is greater than the width of the bottom of the channel. Each finger preferably also has a projection 36a, 36b at its distal end 34a, 34b, respectively, that extends inward toward the opposing finger. The projections are spaced apart a distance so that at least a portion of the fingers are biased against the guide in a manner which creates an over-the-center lock condition relative to the guide when the divider is in a substantially vertical position. The projections are biased into contact with the guide by, for example, being slightly undersized with respect to the lateral diameter of the guides.

FIGS. 4 through 6 show the preferred embodiment of the removable divider 50 of the present invention. Although FIG. 1 shows a single divider for the channel, any number of dividers for each channel may be used with the tray of the present invention so that any number of items may be securely stored within the tray. The divider 50 has a guide 52 extending from the bottom of the divider. In the most preferred embodiment, the guide 52 is placed at about the center point between the lateral ends 51 of the divider. Of course it is to be understood that the guide can be placed anywhere along the bottom of the divider.

The guide 52 has a flange 54 ending in a bottom 58, preferably rounded. The diameter or lateral width of the bottom is slightly larger than the width between the projections 36 on the fingers. The bottom may have any suitable shape such that when the divider is in a substantially vertical position, the divider can slide along the channel and when the divider is tilted from the substantially vertical position, the divider is substantially secured in position. For example, the bottom may be spherical, square, rectangular, elliptical, cylindrical, triangular and the like. Preferably, the bottom is oblong shaped with its longest dimension being substantially normal to the major plane of the divider.

As best seen in FIG. 5, the ends 60 of the bottom are tapered. A slight depression 56 may be formed at the junction of the flange 54 and the bottom 58 to receive the projection 36 when the divider is in the substantially vertical position.

The divider 50 also preferably includes a stabilizing member 62, more preferably, two stabilizing members 62. The stabilizing member includes a foot 64 located on the bottom of the divider parallel to the guide with at least one of its ends extending beyond the major plane of the divider. Preferably, the stabilizing member has an inverted T-shape that extends downward from the divider to provide a horizontal foot 64, with each end extending beyond and substantially normal to the major plane of the divider. Preferably, each end of the foot is inclined upward from the horizontal a slight amount to aid in stabilizing the divider when the divider is tilted from a substantially vertical position. In the preferred embodiment, the stabilizing member is co-extensive with the lateral side of the divider. In the most preferred embodiment, a stabilizing member is provided co-extensive with each lateral side of the divider.

In a preferred embodiment, the bottom 12 has at least one groove 26 that extends parallel to and has substantially the same length as the channel, e.g., substantially from the front wall to the rear wall of the tray. It is to be understood, however, that it is not necessary for the groove to have the same length as the channel. The groove receives a stabilizing member provided on the divider so that when the guide of the divider engages the channel, the divider is substantially restricted from torsional movement, as will be more fully discussed below. The groove can be placed in any location parallel to and spaced from the channel. Preferably, when the channel is provided longitudinally, i.e., parallel to the first or second side wall, a groove is placed adjacent either the first or second side wall. More preferably, a first groove 26a is provided adjacent the first side wall and a second groove 26b is provided adjacent the second side wall. Where the channel is provided laterally, i.e., parallel to the front and rear wall, the groove is preferably placed adjacent the front or rear wall, and more preferably, a first groove is placed adjacent the front wall and a second groove is placed adjacent the rear wall.

In the embodiment where the fingers are resilient, a removable divider 50 is engaged with the tray by "snapping" the guide into the channel of the tray. In other words, the guide is positioned above the channel and the divider is urged downward causing the fingers to spread apart until the guide is located within the channel. The projections will then engage the slight depression 56 on the guide. When the major plane of the divider is in a substantially vertical position, the divider may be slidably moved to any position along the channel. In the embodiment where the fingers are rigid or stiff, the divider is placed in a substantially vertical position adjacent an end of the channel spaced from the wall and then the guide is slid into the channel. In the preferred embodiment, the stabilizing members fit within the grooves so that the dividers are restricted from torsional movement.

When, however, the major plane of divider is tilted from a substantially vertical position, one end of the guide engages the lowermost portion of the channel and the other end engages the projections on the fingers to secure the divider in position. Advantageously, when the divider is tilted from the substantially vertical position, any labeling provided on the divider can be easily read.

Figure 8:
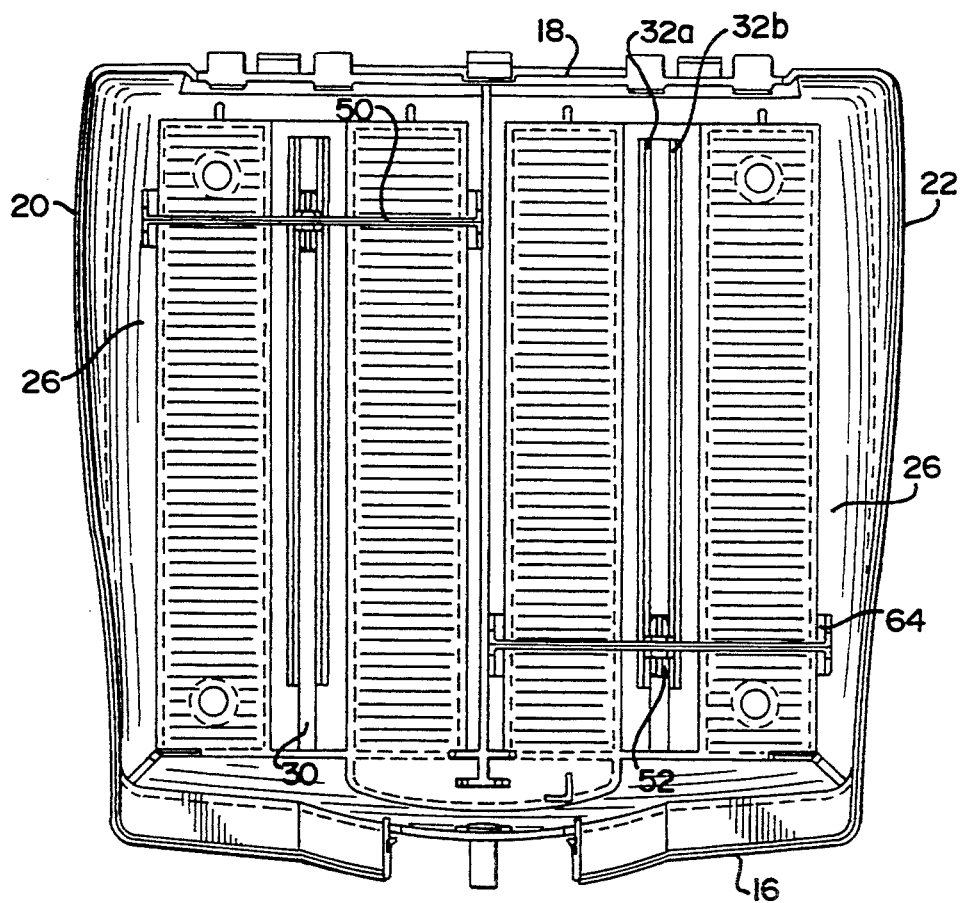
FIG. 8 is a top view of the storage tray of FIG. 7.
Figure 9:
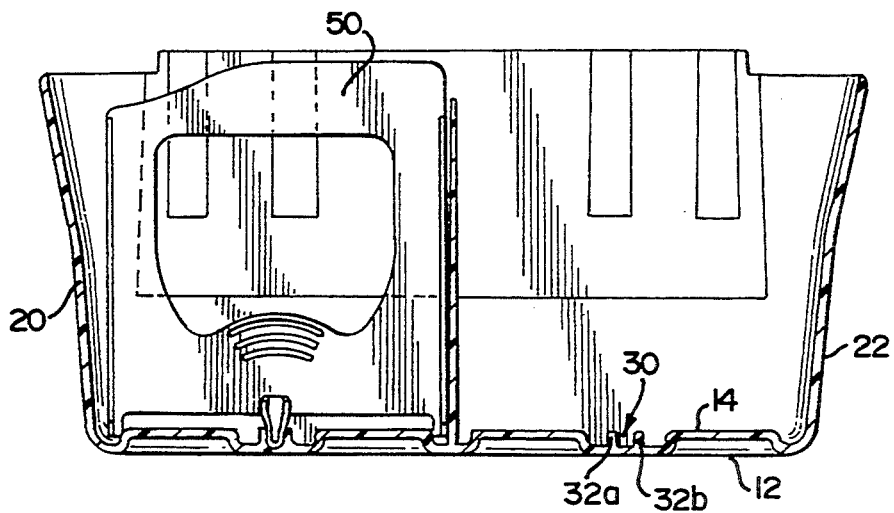
FIG. 9 is a cross-sectional view of the storage tray of FIG. 7 along line 9—9.

FIGS. 7 through 9 show an alternative embodiment of the storage tray. In this embodiment, the storage tray is sized to contain two columns of information storage devices, for example two columns of 3½ inch computer diskettes. Consequently, two channels 30 are provided. In addition, a longitudinal partition 24 that extends upward from the bottom and substantially from the front wall to the rear wall is provided to supply lateral support to the diskettes. Because two channels 30 are provided, at least two dividers 50 are provided, at least one divider for each channel. In a preferred embodiment, a groove 26 is provided adjacent the first side wall and adjacent one side of the partition; a groove 26 is also provided adjacent the second side wall and adjacent the other side of the partition.

Of course it should be understood that a wide range of changes and modifications can be made to the embodiments described above. For example, any number of channels can be provided within the tray as is desired. It is therefore intended that the foregoing description illustrates rather than limits this invention, and that it is the following claims, including all equivalents, which define this invention.

What is claimed:

1. A storage tray comprising:
    a. a bottom with a front wall opposite a rear wall and a first side wall opposite a second side wall, each wall extending upward from the bottom, the front and rear walls being substantially normal to the first and second side walls;
    b. a channel formed on the bottom and extending substantially from the front wall to the rear wall, the channel defined by a pair of spaced apart upward extending fingers that are tapered from the distal end to the proximal end;
    c. at least one divider having a guide that removably engages the channel, the guide being integral and tiltable with the divider, the guide further being shaped to cooperate with the channel so that when the divider is substantially vertical, the guide is substantially vertical and the divider is slidable along the entire length of the channel and when the divider is tilted from the substantially vertical position, the guide is tilted from the substantially vertical position and the divider is substantially secured in position.

2. The storage tray of claim 1 wherein the bottom has a top surface to define a shelf having a height greater than the height of the channel.

3. The storage tray of claim 1 wherein the distal end of each finger has an projection that extends inward toward the other finger.

4. The storage tray of claim 1 wherein the guide is oblong shaped with its longer dimension being normal to the plane of the divider.

5. The storage tray of claim 4 wherein the bottom of the guide is curved.

6. The storage tray of claim 2 wherein the bottom further has a groove formed adjacent at least one of the first and second side wall.

7. The storage tray of claim 6 wherein the divider further has a downward extending stabilizing member that cooperates with the groove to restrict torsional movement of the divider when the guide is engaged with the channel.

8. The storage tray of claim 1 wherein the fingers are substantially equally spaced apart.

9. The storage tray of claim 1 wherein the bottom has a first groove adjacent the first side wall and a second groove adjacent the second side wall and wherein the divider has a first side having a first stabilizing member that cooperates with the first groove and a second side having a second stabilizing member that cooperates with the second groove to restrict torsional movement when the guide is engaged with the channel.

10. A storage tray comprising:
    a. a bottom with a front wall opposite a rear wall and a first side wall opposite a second side wall, each wall extending upward from the bottom, the front and rear walls being substantially normal to the first and second side walls, the bottom further having a groove formed adjacent at least one of the first and second side walls;

b. at least one channel formed on the bottom parallel to the first and second side walls; and, c. at least one divider having a guide that removably engages the channel, the guide being integral and tiltable with the divider, the guide further being oblong shaped with its longer dimension normal to the plane of the divider, so that when the divider is substantially vertical, the guide is substantially vertical and the divider is slidable along the entire length of the channel and when the divider is tilted from the substantially vertical position, the guide is tilted from the substantially vertical position and the divider is substantially secured in position.-

11. The storage tray of claim 10 wherein the divider further has a downward stabilizing member that cooperates with the groove to restrict torsional movement of the divider when the guide is engaged with the channel.

12. The storage tray of claim 10 wherein the channel is defined by a pair of spaced apart upward extending fingers with the fingers being tapered from the distal end to the proximal end.

13. The storage tray of claim 10 wherein the fingers are substantially equally spaced apart.

14. The storage tray of claim 12 wherein the distal end of each finger has a projection that extends inward toward the other finger.

15. The storage tray of claim 10 wherein the bottom of the guide is curved.

16. A storage tray comprising:

a. a bottom with a front wall opposite a rear wall and a first side wall opposite a second side wall, each wall extending upward from the bottom, the front and rear walls being substantially normal to the first and second side walls, the bottom further having a top surface to define a first height and a groove formed adjacent at least one of the first and second side walls;

b. at least one channel formed on the bottom parallel to the first and second side walls, the channel defined by a pair of substantially equally spaced apart upward extending fingers with the fingers being tapered from the distal end to the proximal end and the distal end of each finger has a projection that extends inward toward the other finger, the channel having a second height less than the first height; and, c. at least one divider having a guide that removably engages the channel, the guide being oblong shaped with its longer dimension normal to the plane of the divider and having a curved bottom, so that when the divider is substantially vertical, the divider is slidable along the entire length of the channel and when the divider is tilted from the substantially vertical position, the divider is substantially secured in position, and wherein the divider further has a downward stabilizing member that cooperates with the groove to restrict torsional movement of the divider when the guide is engaged with the channel.

17. The storage tray of claim 16 wherein the bottom has a first groove adjacent the first side wall and a second groove adjacent the second side wall and wherein the divider has a first side having a first stabilizing member that cooperates with the first groove and a second side having a second stabilizing member that cooperates with the second groove to restrict torsional movement when the guide is engaged with the channel.

* * * * *